US012794063B2

(12) United States Patent
Lee et al.

(10) Patent No.: US 12,794,063 B2
(45) Date of Patent: Nov. 10, 2026

(54) BATTERY MODULE AND BATTERY PACK INCLUDING THE SAME

(71) Applicant: LG ENERGY SOLUTION, LTD., Seoul (KR)

(72) Inventors: Jung Hoon Lee, Daejeon (KR); Dooseung Kim, Daejeon (KR); Jaehun Yang, Daejeon (KR); Seho Kim, Daejeon (KR); Jeong Gi Park, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 644 days.

(21) Appl. No.: 18/272,045

(22) PCT Filed: Sep. 1, 2022

(86) PCT No.: PCT/KR2022/013131
§ 371 (c)(1),
(2) Date: Jul. 12, 2023

(87) PCT Pub. No.: WO2023/043099
PCT Pub. Date: Mar. 23, 2023

(65) Prior Publication Data

US 2024/0088504 A1 Mar. 14, 2024

(30) Foreign Application Priority Data

Sep. 17, 2021 (KR) ........................ 10-2021-0124705

(51) Int. Cl.
*H01M 50/242* (2021.01)
*H01M 50/211* (2021.01)
*H01M 50/291* (2021.01)

(52) U.S. Cl.
CPC ....... *H01M 50/242* (2021.01); *H01M 50/211* (2021.01); *H01M 50/291* (2021.01)

(58) Field of Classification Search
None
See application file for complete search history.

(56) References Cited

U.S. PATENT DOCUMENTS

2013/0122390 A1 5/2013 Blunk et al.
2013/0252063 A1 9/2013 Park
(Continued)

FOREIGN PATENT DOCUMENTS

CN 103107296 A 5/2013
CN 106410101 A 2/2017
(Continued)

OTHER PUBLICATIONS

International Search Report (PCT/ISA/210) issued in PCT/KR2022/013131, dated Dec. 13, 2022.

*Primary Examiner* — Haroon S. Sheikh
(74) *Attorney, Agent, or Firm* — Birch, Stewart, Kolasch & Birch, LLP

(57) ABSTRACT

A battery module includes a battery cell stack including a plurality of battery cells stacked and arranged in a first direction; a module housing in which the battery cell stack is housed; and a deformation preventing structure disposed between the outermost battery cell of a plurality of battery cells and the module housing, wherein the module housing includes a housing plate including a space part and disposed adjacent to the outermost battery cell, the deformation preventing structure includes: a pressure plate fixed to the housing plate and supported on the battery cell stack; and a spring structure accommodated in the space part of the housing plate and disposed between the pressure plate and the housing plate. The space part is constituted by a recess portion provided on one side of the housing plate facing the battery cell stack.

10 Claims, 8 Drawing Sheets

(56) References Cited

U.S. PATENT DOCUMENTS

| | | | |
|---|---|---|---|
| 2014/0329166 A1 | 11/2014 | Blunk et al. | |
| 2015/0044540 A1 | 2/2015 | Morton et al. | |
| 2016/0164061 A1 | 6/2016 | Han et al. | |
| 2018/0175343 A1 | 6/2018 | Choi et al. | |
| 2018/0287111 A1 | 10/2018 | Fukuoka et al. | |
| 2019/0341788 A1 | 11/2019 | Lee et al. | |
| 2021/0104789 A1 | 4/2021 | Wu et al. | |
| 2021/0344057 A1 | 11/2021 | Seo et al. | |
| 2022/0166101 A1* | 5/2022 | Gyulai | H01M 50/207 |
| 2023/0018065 A1* | 1/2023 | Schmitt | H01M 10/0525 |
| 2024/0291086 A1 | 8/2024 | Seo et al. | |

FOREIGN PATENT DOCUMENTS

| | | | |
|---|---|---|---|
| CN | 108352470 | A | 7/2018 |
| CN | 207967120 | U | 10/2018 |
| CN | 110444703 | A | 11/2019 |
| CN | 111416167 | A | 7/2020 |
| CN | 211654923 | U | 10/2020 |
| CN | 112542645 | A | 3/2021 |
| EP | 3 125 332 | A1 | 2/2017 |
| EP | 4 024 580 | A1 | 7/2022 |
| JP | 2011-54368 | A | 3/2011 |
| JP | 2018-533825 | A | 11/2018 |
| JP | 2020-31019 | A | 2/2020 |
| JP | 2020-35716 | A | 3/2020 |
| KR | 10-1255250 | B1 | 4/2013 |
| KR | 10-2014-0120550 | A | 10/2014 |
| KR | 10-2016-0050843 | A | 5/2016 |
| KR | 10-2016-0069807 | A | 6/2016 |
| KR | 10-2016-0079515 | A | 7/2016 |
| KR | 10-2017-0013005 | A | 2/2017 |
| KR | 10-2017-0039948 | A | 4/2017 |
| KR | 10-2020-0086172 | A | 7/2020 |
| KR | 10-2021-0112919 | A | 9/2021 |
| WO | WO 2017/088705 | A1 | 4/2017 |
| WO | WO 2020/145549 | A1 | 7/2020 |

* cited by examiner

[FIG. 1]
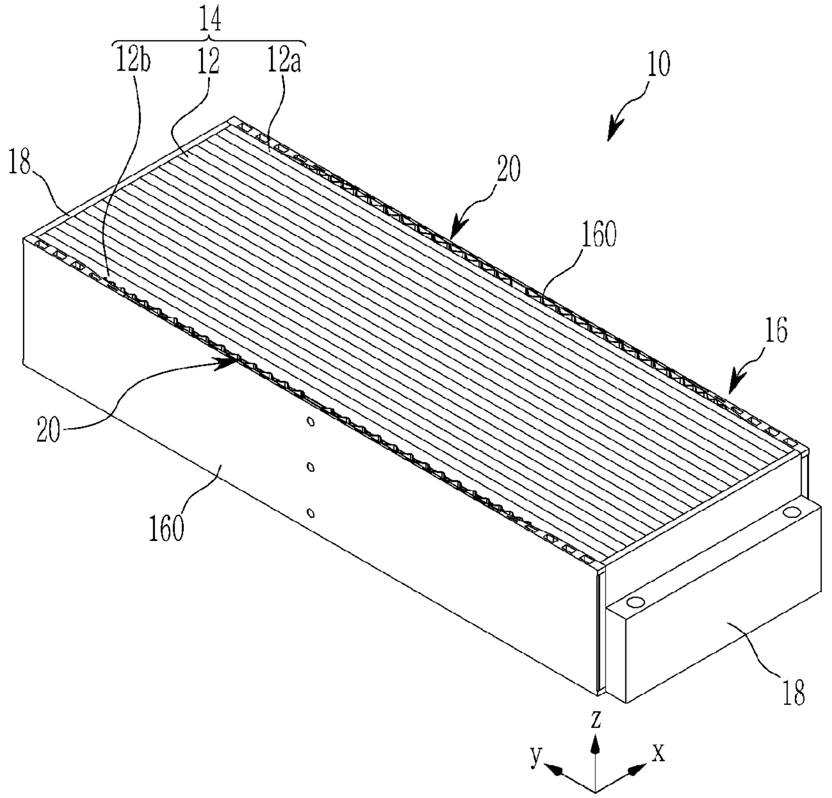

[FIG. 2]
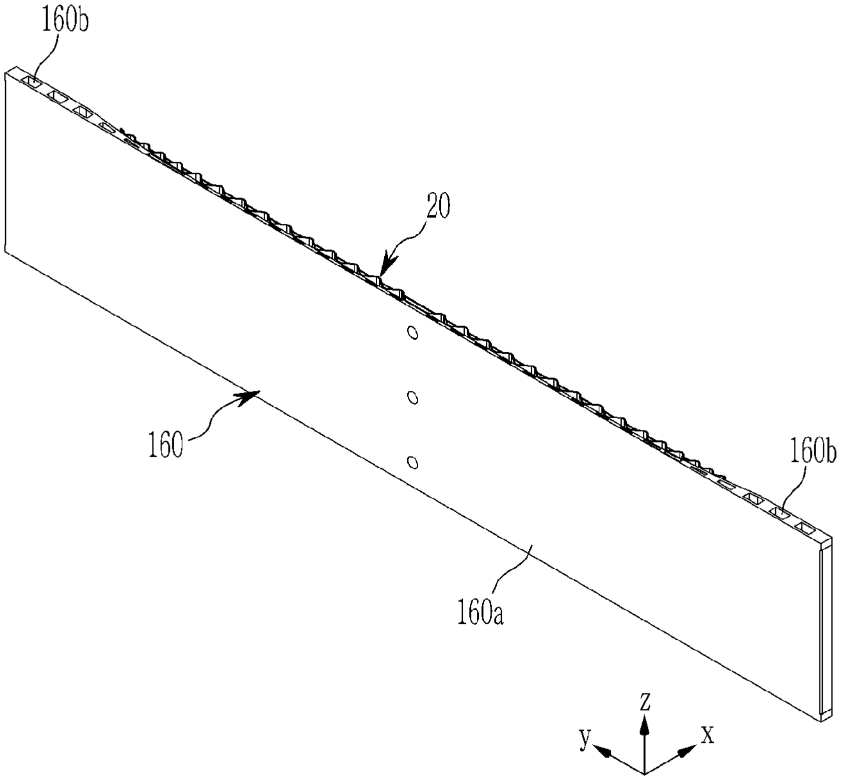

[FIG. 3]
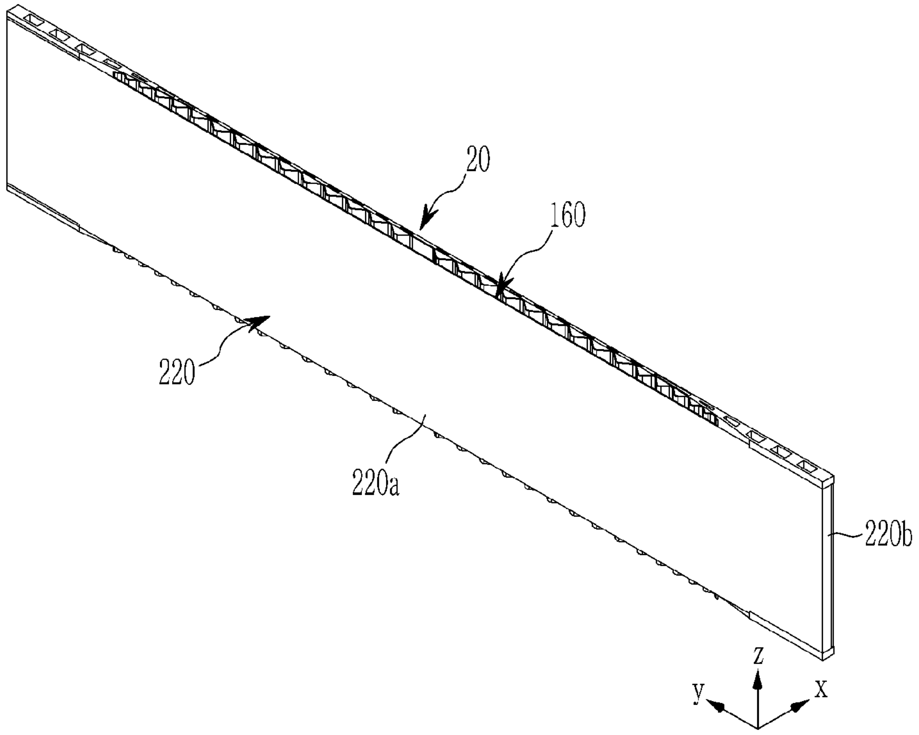

[FIG. 4]
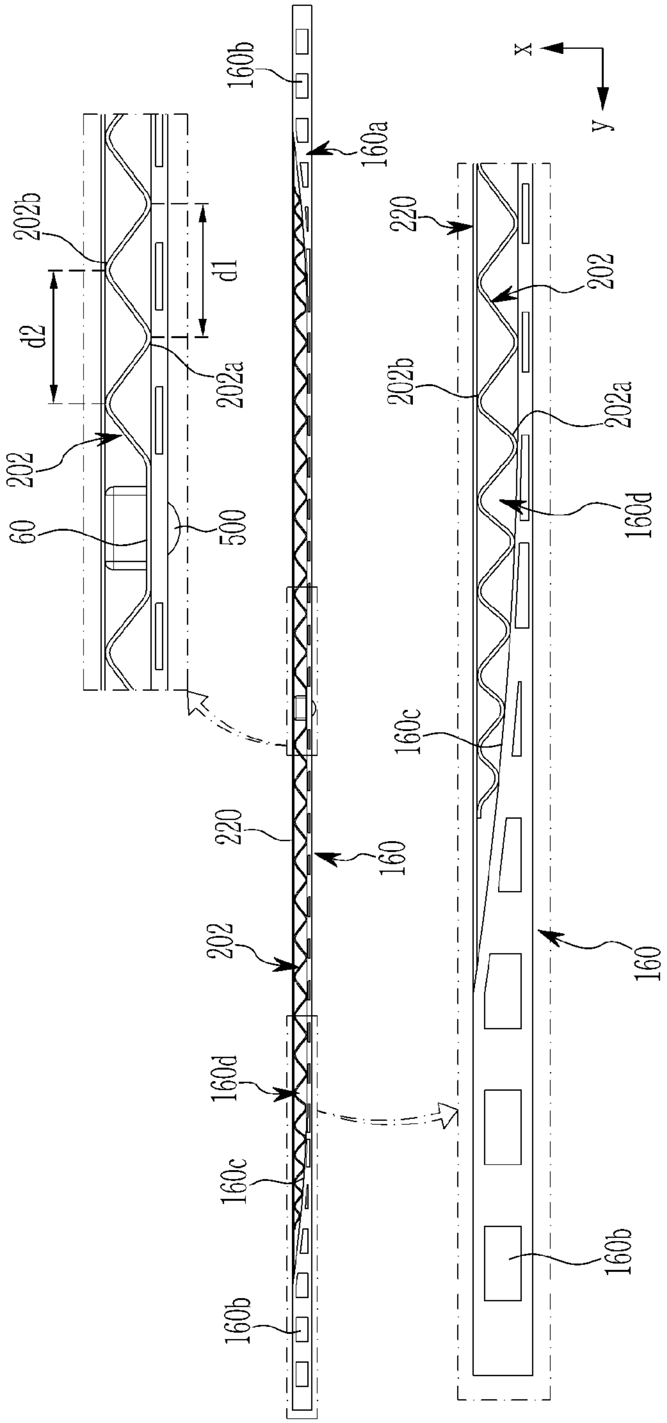

[FIG. 5]
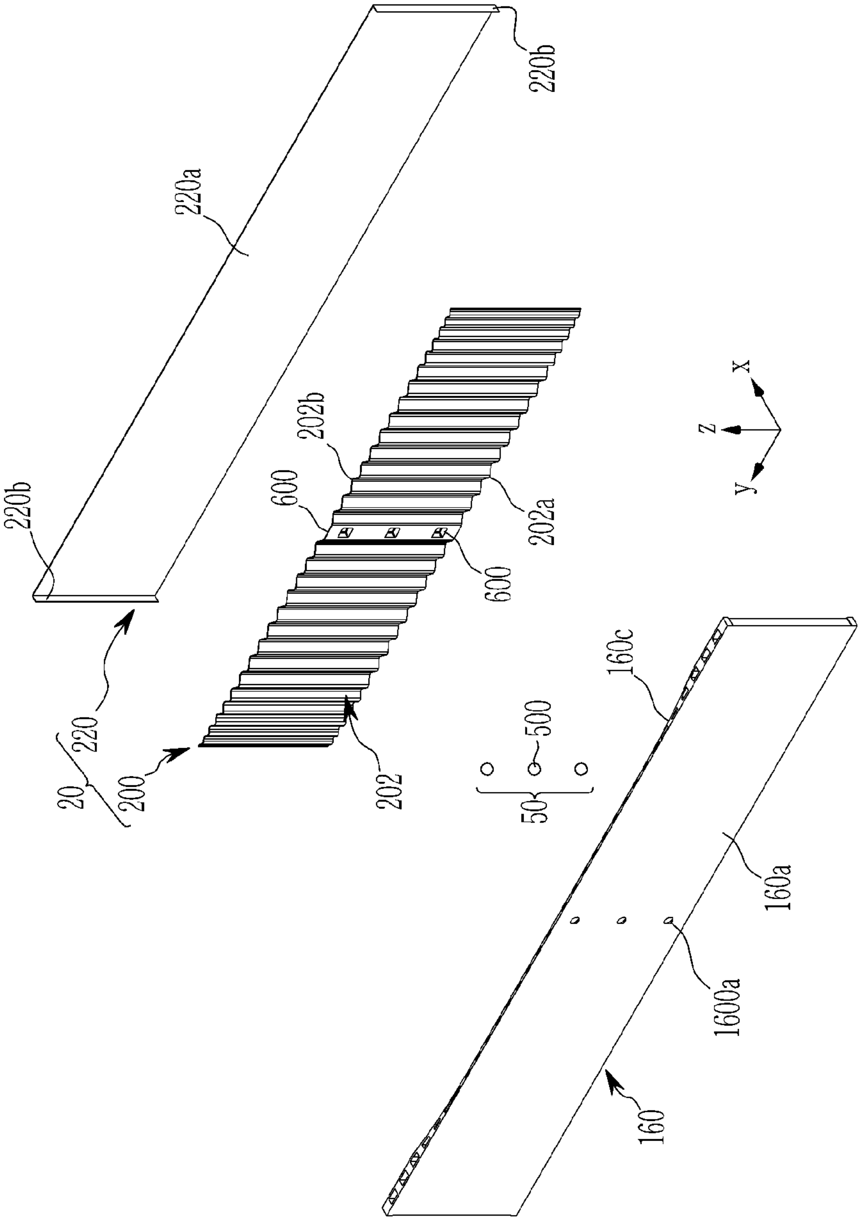

[FIG. 6]
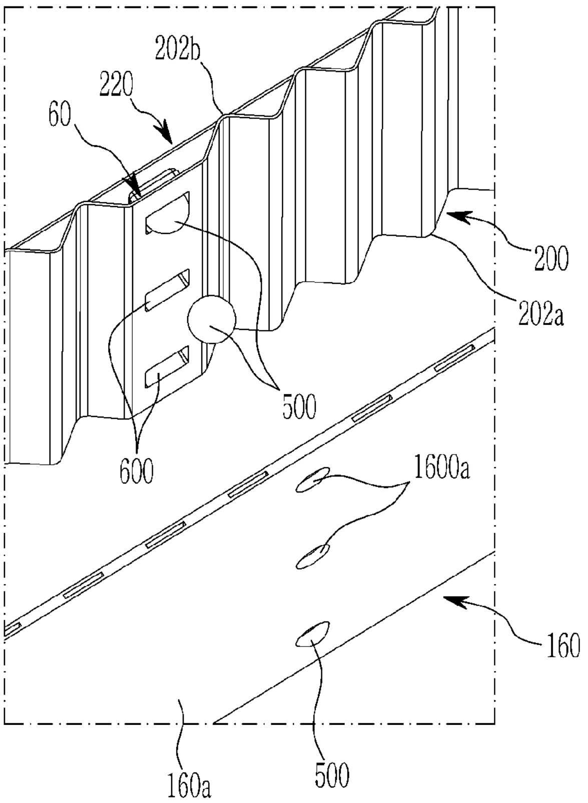

[FIG. 7]
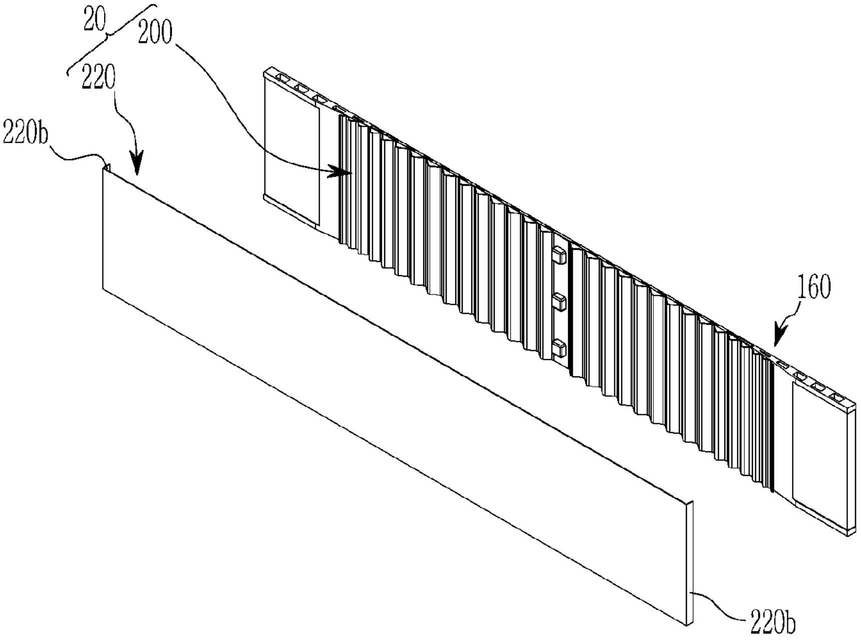

[FIG. 8]
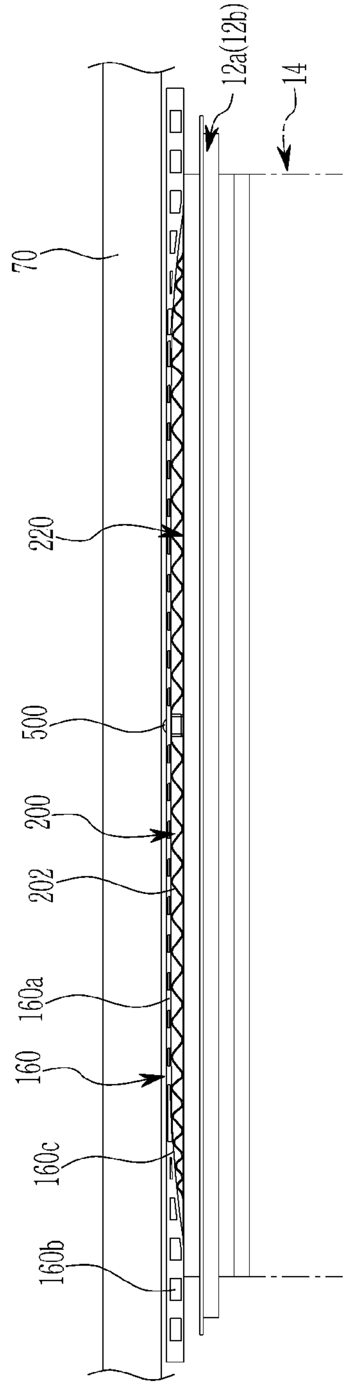

BATTERY MODULE AND BATTERY PACK INCLUDING THE SAME

CROSS-REFERENCE TO RELATED APPLICATION

This application claims priority to and the benefit of Korean Patent Application No. 10-2021-0124705 filed in the Korean Intellectual Property Office on Sep. 17, 2021, the entire contents of which are incorporated herein by reference.

TECHNICAL FIELD

The present invention relates to a battery module, and more specifically, to a battery module housing a battery cell stack in a module housing. In addition, the present invention relates to a battery pack including the above-described battery module.

BACKGROUND ART

As development of technologies and demands for mobile devices are increased, there is a rapidly increasing demand for rechargeable batteries as energy sources. The rechargeable battery is attracting lots of interest as an energy source for a power device such as an electric bicycle, an electric vehicle, and a hybrid electric vehicle as well as a mobile device such as a mobile phone, a digital camera, a notebook computer, and a wearable device.

One or two or more rechargeable batteries cells are used for one small-scale mobile device, whereas the rechargeable battery is required to be provided with a high-output, high-capacity for a middle-scale or large-scale device such as a vehicle. To this end, a plurality of battery cells may be electrically connected to constitute one module, or may be applied to a product as a pack in which a plurality of modules are electrically connected to each other.

The battery module, for example, may be configured by wrapping and fixing a stack of a plurality of battery cells arranged along one direction with a member constituting the module housing. Here, the members constituting the module housing are required to be provided with a rigid structure so that the shape of the module housing, that is, the battery module, is not deformed by a swelling phenomenon of the battery cell.

DISCLOSURE

Technical Problem

The problem to be solved by the present invention is to provide a battery module capable of minimizing a displacement deviation of each part of the battery cell due to a swelling phenomenon of the battery cell and a battery pack including the same.

However, the problem to be solved by the embodiments of the present invention is not limited to the above-described problem, and may be variously expanded in the range of the technical ideas included in the present invention.

Technical Solution

A battery module according to an embodiment of the present invention includes: a battery cell stack including a plurality of battery cells stacked and arranged in a first direction; a module housing in which the battery cell stack is housed; and a deformation preventing structure disposed between an outermost battery cell of the plurality of battery cells and the module housing. The module housing includes a housing plate including a space part and disposed adjacent to the outermost battery cell. The deformation preventing structure includes: a pressure plate fixed to the housing plate and supported on the battery cell stack; and a spring structure accommodated in the space part of the housing plate and disposed between the pressure plate and the housing plate. The space part is a recess portion provided on one side of the housing plate facing the battery cell stack.

The housing plate may include a cover body disposed in a second direction and including the recess portion, and the pressure plate may include a pressure body in the second direction and supported on the outermost battery cell, and a fixing part disposed at each end of the pressure body and fixed to each end of the housing plate.

The recess portion may be provided on the cover body with a depth that increases from a periphery to a center of the housing plate.

A cross-sectional shape of the recess portion cut in the second direction of the housing plate may be an arc shape.

The spring structure may include a wave-shaped spring in which a plurality of first protrusion parts supported on the housing plate and a plurality of second protrusion parts supported on the pressure plate are continuously connected.

An interval between a plurality of first protrusion parts or between a plurality of second protrusion parts decreases from a center toward a periphery of the wave-shaped spring.

The deformation preventing structure may further include a protruded part supported on the pressure plate and protruded into an outer surface of the housing plate.

The spring structure may include a joint part disposed at the center of the wave-shaped spring and having a receiving part, and the protruded part may include at least one steel ball that is received in the receiving part and is partially protruded through an opening in the housing plate.

The receiving part may include at least one recess facing the recess portion, and the at least one steel ball is inserted into the at least one recess.

The at least one recess may be a plurality of recesses along a height direction of the joint part, and the at least one steel ball may be a plurality of steel balls inserted into the plurality of recesses, respectively.

A battery pack according to another embodiment of the present invention includes the battery module described above.

The battery pack may include a carrier frame in which the battery module is accommodated, the carrier frame may include a beam member neighboring the housing plate, and the distance between the beam member and the protruded part may be less than the distance between the beam member and the housing plate.

Advantageous Effects

According to the embodiment, when the swelling phenomenon occurs from the battery cell stack, the deformation preventing structure may minimize the deformation of the battery cell stack as well as the module housing.

Accordingly, the battery module according to the embodiment may suppress the deterioration of the cycle-life of the battery cell.

The effects of the present invention are not limited to the foregoing effects, and other non-mentioned effects will be clearly understood by those skilled in the art from the description below.

DESCRIPTION OF THE DRAWINGS

FIG. 1 is a perspective view of a battery module according to an embodiment of the present invention.

FIG. 2 is a combined perspective view of a housing plate and a deformation preventing structure according to an embodiment of the present invention.

FIG. 3 is a rear perspective view of FIG. 2.

FIG. 4 is a top plan view of FIG. 2.

FIG. 5 is an exploded perspective view of FIG. 2.

FIG. 6 is a view to explain that a steel ball of a deformation preventing structure according to an embodiment of the present invention is inserted into a receiving part of a joint part.

FIG. 7 is a view illustrating a process of assembling a deformation preventing structure and a housing plate according to an embodiment of the present invention.

FIG. 8 is a view illustrating a battery pack including a battery module according to an embodiment of the present invention.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are irrelevant to the description are omitted in the drawings for clear description of the present invention, and like reference numerals designate like elements throughout the specification.

Further, the size and thickness of the elements shown in the drawings are arbitrarily illustrated for better understanding and ease of description, and the present invention is not necessarily limited thereto. In the drawings, the thickness of layers, films, panels, regions, etc., are exaggerated for clarity. In the drawings, for convenience of description, the thickness of layers, films, panels, areas, etc., are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

FIG. 1 is a perspective view showing a battery module according to an embodiment of the present invention. As shown in FIG. 1, the battery module 10 according to the embodiment is configured as a stacked battery cell stack 14 in which a plurality of battery cells 12, 12*a*, and 12*b* are arranged and stacked in a first direction x are accommodated in a module housing 16.

In the present embodiment, the battery cell 12 may be constructed by housing an electrode assembly in a pouch-type reachable battery, for example, an inner space of a pouch, and by exposing each lead electrically connected to positive electrodes and negative electrodes of the electrode assembly to be disposed in a second direction perpendicular to the first direction x to the outside of the pouch. The pouch may have a shape of a long approximate rectangle along the second direction y. However, in the present invention, the battery cell is not necessarily limited to this configuration.

The module housing 16 may include a pair of housing plates (or base plates) 160 disposed to surround the battery cell stack 14, and a top plate and a bottom plate, which are not shown. This module housing 16 forms an internal space in which the battery cell stack 14 may be accommodated by mutual coupling (e.g. a snap fit or welding) of the housing plate 160, the top plate, and the bottom plate. The housing plate 160, the top plate, and the bottom plate may be provided with a metal material for rigidity of the module housing 16, but the material thereof is not necessarily limited thereto.

At both ends of the module housing 16 in the second direction y, a pair of cover plates 18 coupled to the module housing 16 while shielding a bus bar (not shown) that electrically connects each terminal of a plurality of battery cells 12 to close and seal the interior space may be disposed.

In this battery module 10, the housing plate 160 of the module housing 16 is configured so that the reaction force against the expansion force of the battery cells 12, 12*a*, and 12*b* is not deteriorated when the battery module 10 is applied to a product (e.g., an electric vehicle) and swelling occurs from the battery cell stack 14 during the use.

To this end, in the battery module 10 of the present embodiment, the deformation preventing structure 20 is disposed between the housing plate 160 and the outermost battery cells 12*a* and 12*b* of the battery cell stack 14. The deformation preventing structure 20 prevents the battery cell stack and/or the module housing from being deformed by the swelling phenomenon. In other words, the deformation preventing structure 20 minimizes the deviation for the reaction force of the housing plate 160 against the battery cell stack 14 when the swelling phenomenon does not occur in the battery cell stack 14, and the reaction force of the housing plate 160 against the battery cell stack 14 when the swelling phenomenon occurs in the battery cell stack 14, thereby the battery cell stack 14 and the housing plate 160 are not deformed, or the battery cell stack 14 or the housing plate 160 is not deformed by the swelling phenomenon.

In the present embodiment, the deformation preventing structure 20 may consist of an assembly coupled to a pair of housing plates 160. Since this assembly has the same structure, in the following description, for convenience, it is described with reference to the housing plate 160 of one side (the housing plate disposed on the left in FIG. 1).

FIG. 2 is a combined perspective view of a housing plate and a deformation preventing structure according to an embodiment of the present invention, FIG. 3 is a rear perspective view of FIG. 2, FIG. 4 is a top plan view of FIG. 2, and FIG. 5 is an exploded perspective view of FIG. 2.

Referring to FIG. 2 to FIG. 5, the housing plate 160 has a long shape disposed along the length direction (or the second direction, y) of the battery module 10 or the battery cell stack 14, and is disposed adjacent to the outermost battery cells 12*a* and 12*b* of the battery cell stack 14.

In the present embodiment, the housing plate 160 includes a cover body 160*a* that is disposed to be elongated along the second direction x. The cover body 160*a* has a predetermined length and thickness and may be made of a metal material (e.g., aluminum). In the interior of the cover body 160*a*, a hollow portion 160*b* having both ends opened for light weight and rigid structure of the housing plate 160 may be provided along a third direction z perpendicular with respect to the first direction x and the second direction y.

One surface of the cover body 160*a* (a surface facing the battery cell stack) is entirely flat, and a recess portion 160*c* is positioned on the other surface (a surface facing the battery cell stack) of the cover body 160*a*.

In the present embodiment, the portion where the recess portion 160*c* is positioned may be formed in the entire remaining portion of the cover body 160*a* except for the peripheral portions of both ends of the cover body 160*a*, and a predetermined area of the recess portion 160*c* may be appropriately adjusted in consideration of the swelling area of the battery cell stack.

In the present embodiment, the recess portion 160*c* may have a shape that increases in depth from both peripheral portions to the center of the housing plate 160, for example, a shape in which a cross-sectional shape is formed of an arc shape when the cover body 160*a* is cut in a direction parallel to the length direction y of the housing plate 160.

Such a housing plate 160 may be manufactured as a rigid structure by extrusion molding.

Meanwhile, the housing plate 160 may have a space part 160*d* of as much as a concave area due to the recess portion 160*c*. A spring structure 200 of the deformation preventing structure 20, which will be described later, is accommodated in this space part 160*d*.

In the present embodiment, the deformation preventing structure 20 includes a pressure plate 220 coupled to a housing plate 160 and supported on the battery cell stack 14. The pressure plate 220 includes a pressure body 220*a* that is disposed long along the length direction y of the battery cell stack 14, and a fixing part 220*b* that is disposed at both ends of the pressure body 220*a* and is coupled to both ends of the housing plate 160. The pressure plate 220 may be made of a metal material (e.g., stainless steel).

The pressure body 220*a* of the pressure plate 220 may have a long shape along the second direction y, similar to the cover body 160*a* of the housing plate 160. Both surfaces of the pressure body 220*a* are substantially flat. The fixing part 220*b* of the pressure plate 220 is a part that is bent and extended from both ends of the pressure body 220*a*, and this is fitted to both ends of the cover body 160*a* of the housing plate 160 so that the housing plate 160 and the pressure plate 220 may be fixedly coupled to each other. Step portions may be provided at both ends of the cover body 160*a* of the housing plate 160 for stable fixing of the fixing part 220*b* of the pressure plate 220.

According to the combination of the housing plate 160 and the pressure plate 220, the space part 160*d* formed by the recess portion 160*c* may be positioned between the cover body 160*a* of the housing plate 160 and the pressure body 220*a* of the pressure plate, while being covered by the pressure body 220*a* of the pressure plate 220.

The deformation preventing structure 20 includes a spring structure 200 positioned in the space part 160*d* to apply an elastic force to the pressure plate 220 and the housing plate 160. In the present embodiment, the spring structure 200 may be provided as a wave-shaped spring 202 constituted by a plurality of first protrusion parts 202*a* and a plurality of second protrusion parts 202*b* being successively connected. When the wave-shaped spring 202 is accommodated in the space part 160*d*, a plurality of first protrusion parts 202*a* may be supported by being in contact with the housing plate 160, and a plurality of second protrusion parts 202*b* may be supported by being in contact with the pressure plate 220.

The wave-shaped spring 202 may also have a long shape along the second direction y corresponding to the housing plate 160 and the pressure plate 220. In this case, the interval d1 between a plurality of first protrusion parts 202*a* or the interval d2 between a plurality of second protrusion parts 202*b* may become narrower from the center to the periphery of the wave-shaped spring 202. For example, in the area from the center to the end of the wave-shaped spring 202, from the center to the approximate 3/5 point, the interval d1 between the protrusion parts 202*a* or the interval d2 between a plurality of second protrusion parts 202*b* is formed to maintain the constant interval, and from the approximate 3/5 point to the remaining 2/5 point, the interval d1 between the first protrusion parts 202*a* or the interval d2 between a plurality of second protrusion parts 202*b* may gradually narrow. However, the interval between the first protrusion parts 202*a* and the second protrusion parts 202*b* is not limited thereto, and may be appropriately adjusted in consideration of the swelling area of the battery cell stack.

In addition, since the wave-shaped spring 202 should be seated in the space part 160*d* made of the recess portion 160*c*, the height (example: a straight line distance from the apex of the first protrusion parts to the pressure plate or a straight line distance from the apex of the second protrusion parts to the housing plate) and the angle (example: the angle between the bended parts of the wave-shaped spring constituting the first protrusion parts or the angle between the bend parts of the wave-shaped spring constituting the second protrusion parts) of the parts substantially composing the first protrusion parts 202*a* or the second protrusion parts 202*b* disposed to the periphery are formed to be smaller than the height and the angle of the parts substantially composing the first protrusion parts 202*a* or second protrusion parts 202*b* disposed to the center. Here, the height and the angle of each part may also be appropriately adjusted in consideration of the swelling part of the battery cell stack.

The wave-shaped spring 202 is a high rigidity spring and may be made of a metal such as stainless steel or a plastic material such as carbon fiber reinforced plastic (CFRP).

The deformation preventing structure 20 may include a further protruded part 50 that is protruded from the outer surface of the housing plate, i.e., the surface of the housing plate 160 opposite to the battery cell stack 14, while being supported by the pressure plate 220. This protruded part 50 serves to suppress the deformation of the housing plate 160 when the battery cell stack 14 is swollen, which will be described later.

In the present embodiment, the protruded part 50 consists of a steel ball (or a ball) 500 with a constant diameter. The steel ball 500 is partially exposed through the opening 1600*a* passing through the cover body 160*a* of the housing plate 160 while being inserted into the receiving part 600 provided in the joint part 60 connected to the wave-shaped spring 202. That is, in the present embodiment, the protruded part 50 consists of a part of the steel ball 500 partially exposed from the housing plate 160.

In the present embodiment, the joint part 60 is disposed in the center of the wave-shaped spring 202 and is connected to the second protrusion parts 202*b* disposed adjacent to both ends thereof. The receiving part 600 of the joint part 60 may be made of a depression disposed to face the recess portion 160*c* of the housing plate 160. This receiving part 600 is disposed as three, for example, along the length direction z of the joint part 60 in the present embodiment, and the steel ball 500 is inserted into these three receiving parts 600, respectively. Such joint part 60 may be integrally formed with the wave-shaped spring 202 when the wave-shaped spring 202 is manufactured (refer to FIG. 6).

In the deformation preventing structure 20 configured in this way, the spring structure 200 is provided with the state that the steel ball 500 is inserted into the receiving part 600 of the joint part 60 (referring to FIG. 6), the spring structure 200 is accommodated in the recess portion 160*c* of the housing plate 160 so that a part of the steel ball 500 is exposed to the outside of the housing plate 160 through the opening 1600*a* (referring to FIG. 7), and as the pressure plate 220 binds and fixes the fixing part 220*b* to both ends of the housing plate 160 while covering the spring structure 200, it is assembled with the housing plate 160 (referring to FIG. 3).

The housing plate 160 assembled with the deformation preventing structure 20 may be combined with the top plate and the bottom plate to constitute the module housing 16, and as long as the module housing 16 accommodates the battery cell stack 14 in the internal space, it may be combined with the cover plate 18 to form the battery module 10.

FIG. 8 is a view showing a battery pack including a battery module 10 according to an embodiment. The battery pack may include a beam member (e.g., a vertical beam) 70 constituting a carrier frame, and the battery module 10 may be installed as at least one provided in the carrier frame. When the battery module 10 is installed in the carrier frame, the housing plate 160 may be disposed to the beam member 70 with the interval of several mm.

The battery module 10 according to the present embodiment may be applied and used in devices that require high-capacity power such as electric vehicles, and may minimize the deformation of the battery module 10 even when a swelling phenomenon occurs from the battery cell stack 14.

This is because the wave-shaped spring 202, which is the spring structure 200 of the deformation preventing structure 20, exerts elasticity to counteract between the battery cell stack 14 and the housing plate 160 even if the deformation of the battery cell due to the swelling of the battery cell stack 14 occurs. In the battery cell stack 14, when the battery cell positioned at the periphery of the battery cell stack 14, including the outermost battery cells 12*a*, and 12*b*, causes the swelling phenomenon, since the wave-shaped spring 202 is configured to apply more elastic force towards the center rather than the periphery of the swollen battery cell, it is possible to reduce the deviation for the deformation of each part of the battery cell due to the swelling.

Moreover, even if the housing plate 160 is deformed in the first direction x by the swelling, because the steel ball 500, which is the protruded part 50 of the deformation preventing structure 20, is in first contact with the beam member 70 and is supported rather than the housing plate 160, the reaction force of the housing plate 160 against the swelling of the battery cell stack 14 may not deteriorate.

In the present embodiment, the deformation preventing structure 20 has been disclosed as including both the spring structure 200 and the protruded part 50, but it is possible for the deformation preventing structure 20 of the present invention to include only the spring structure 200.

The battery module described above and the battery pack including the same may be applied to various devices. Such a device may be applied to transportation means such as an electric bicycle, electric vehicle, hybrid vehicle, etc., but the present invention is not limited thereto and is applicable to various devices that can use a battery module, to which the scope of the present invention also belongs.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: battery module
12: battery cell
12*a*, 12*b*: outermost battery cell
14: battery cell stack
16: module housing
20: deformation preventing structure
160: housing plate
160*c*: recess portion
160*d*: space part
200: spring structure
220: pressure plate

The invention claimed is:

1. A battery module comprising:
a battery cell stack including a plurality of battery cells stacked and arranged in a first direction;
a module housing in which the battery cell stack is housed; and
a deformation preventing structure disposed between an outermost battery cell of the plurality of battery cells and the module housing,
wherein the module housing includes a housing plate including a space part, the housing plate being disposed adjacent to the outermost battery cell,
wherein the deformation preventing structure includes:
a pressure plate fixed to the housing plate and supported on the battery cell stack; and
a spring structure accommodated in the space part of the housing plate and disposed between the pressure plate and the housing plate,
wherein the space part is a recess portion provided on one side of the housing plate facing the battery cell stack,
wherein the housing plate includes a cover body disposed in a second direction and including the recess portion, and
wherein the pressure plate includes a pressure body disposed in the second direction and supported on the outermost battery cell, and a fixing part disposed at each end of the pressure body and fixed to each end of the housing plate.

2. The battery module of claim 1, wherein the recess portion is provided on the cover body with a depth that increases from a periphery to a center of the housing plate.

3. The battery module of claim 2, wherein a cross-sectional shape of the recess portion cut in a direction parallel to the second direction of the housing plate has an arc shape.

4. The battery module of claim 1, wherein the spring structure includes a wave-shaped spring in which a plurality of first protrusion parts supported on the housing plate and a plurality of second protrusion parts supported on the pressure plate are continuously connected.

5. The battery module of claim 4, wherein an interval between a plurality of first protrusion parts or between a plurality of second protrusion parts decreases from a center toward a periphery of the wave-shaped spring.

6. A battery module comprising:

a battery cell stack including a plurality of battery cells stacked and arranged in a first direction;

a module housing in which the battery cell stack is housed; and a deformation preventing structure disposed between an outermost battery cell of the plurality of battery cells and the module housing, wherein the module housing includes a housing plate including a space part, the housing plate being disposed adjacent to the outermost battery cell, wherein the deformation preventing structure includes:

a pressure plate fixed to the housing plate and supported on the battery cell stack; and a spring structure accommodated in the space part of the housing plate and disposed between the pressure plate and the housing plate, wherein the space part is a recess portion provided on one side of the housing plate facing the battery cell stack, wherein the spring structure includes a wave-shaped spring in which a plurality of first protrusion parts supported on the housing plate and a plurality of second protrusion parts supported on the pressure plate are continuously connected, wherein an interval between a plurality of first protrusion parts or between a plurality of second protrusion parts decreases from a center toward a periphery of the wave-shaped spring, and wherein the deformation preventing structure further includes a protruded part supported on the pressure plate and protruded to an outer surface of the housing plate.

7. The battery module of claim 6, wherein the spring structure includes a joint part disposed at the center of the wave-shaped spring and having a receiving part, and wherein the protruded part includes at least one steel ball that is received in the receiving part and is partially protruded through an opening in the housing plate.

8. The battery module of claim 7, wherein the receiving part includes at least one recess facing the recess portion, and the at least one steel ball is inserted into the at least one recess.

9. The battery module of claim 8, wherein the at least one recess is a plurality of recesses along a height direction of the joint part, and the at least one steel ball is a plurality of steel balls inserted into the plurality of recesses, respectively.

10. A battery pack comprising:

a battery module of claim 6; and a carrier frame in which the battery module is accommodated, wherein the carrier frame includes a beam member neighboring the housing plate, and wherein a distance between the beam member and the protruded part is less than a distance between the beam member and the housing plate.

* * * * *